United States Patent [19]

Ariga

[11] 4,036,014
[45] July 19, 1977

[54] METHOD OF REDUCING EMISSION OF POLLUTANTS FROM MULTI-CYLINDER ENGINE

[75] Inventor: Hajime Ariga, Kamakura, Japan

[73] Assignee: Nissan Motor Co., Ltd., Yokohama, Japan

[21] Appl. No.: 618,402

[22] Filed: Oct. 10, 1975

Related U.S. Application Data

[63] Continuation of Ser. No. 474,331, May 29, 1974, abandoned.

[30] Foreign Application Priority Data

May 30, 1973   Japan ............................ 48-60668

[51] Int. Cl.² ................. F02B 75/10; F02M 23/04
[52] U.S. Cl. ............................. 60/274; 60/282;
                                               123/119 DB; 123/124 R

[58] Field of Search ....... 123/124 R, 119 D, 119 DB, 123/198 F; 60/282, 274

[56] References Cited

U.S. PATENT DOCUMENTS

| 2,152,028 | 3/1939 | Church ............................ 123/124 R |
| 3,023,745 | 3/1962 | Barnes ............................ 123/124 R |
| 3,578,116 | 5/1971 | Nakajima ........................ 123/198 F |
| 3,708,980 | 1/1973 | Truxell ................................ 60/282 |
| 3,756,027 | 9/1973 | Gotoh ................................. 60/282 |
| 3,827,237 | 8/1974 | Linder ................................ 60/274 |

*Primary Examiner*—Douglas Hart

[57] ABSTRACT

NOx concentration in the exhaust gas is reduced by supplying an extremely rich air-fuel mixture to half of the cylinders and an extremely lean mixture to the remaining cylinders. HC and CO in the exhaust are oxidized in a reactor due to existence of excess air left after combustion of the lean mixture.

8 Claims, 7 Drawing Figures

METHOD OF REDUCING EMISSION OF POLLUTANTS FROM MULTI-CYLINDER ENGINE

This is a Continuation of application Ser. No. 474,331, Filed May 29, 1974, now abandoned.

The present invention relates to a method of reducing the pollutant concentration in the exhaust gas from multi-cylinder internal-combustion engines.

Among pollutants in the exhaust gas from an internal-combustion engine, oxides of nitrogen (NOx) are known to be the most difficult to eliminate. As is well known, the concentration of NOx in the exhaust gas becomes highest when the air/fuel ratio of a combustion mixture lies in a range near the stoichiometric ratio, namely, about 15:1 for air/gasoline, and most engines are designed to employ a ratio within such range. It is also known that employment of an air/fuel ratio extremely remote from the stoichiometric, whether larger or smaller, results in reduction of NOx emission, but such deviation of the air/fuel ratio is inevitably accompanied with serious problems such as reduction of engine performance, sometimes as far as inoperativeness, and increase in emission of other kinds of pollutants.

It is therefore an object of the present invention to provide a method of reducing the amount of NOx emission from a multi-cylinder engine accompanied with minimized adverse effects on the engine operation.

There is provided according to the invention a method of reducing concentration of oxides of nitrogen (NOx) in exhaust gas from a multi-cylinder internal-combustion engine comprising; supplying a first air-fuel mixture having a first air/fuel ratio lower than a stoichiometric ratio to a first group of engine cylinders consisting of about half the number of total engine cylinders, and supplying a second air-fuel mixture having a second air/fuel ratio higher than the stoichiometric ratio to a second group of engine cylinders consisting of the remaining engine cylinders.

Other features and advantages of the invention will become clear from the following detailed description of the invention referring to the accompanying drawings, in which.

Figure 1:
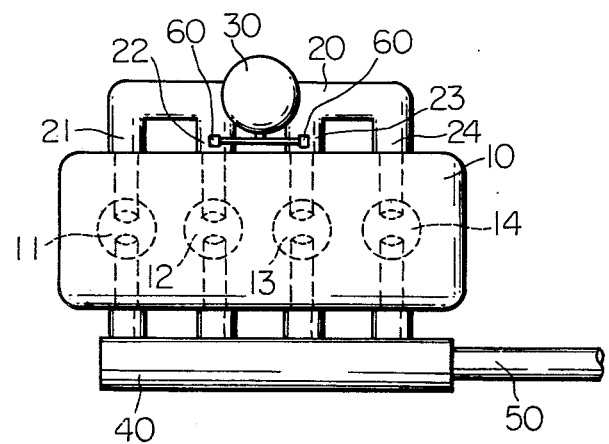
FIG. 1 is a schematic plan view of a four-cylinder engine equipped with air fed devices, according to a first preferred embodiment of the invention.

A four-cylinder internal-combustion engine 10 in FIG. 1 is furnished with an intake manifold 20 to supply engine cylinders 11, 12, 13 and 14 with an air-fuel mixture prepared in a carburetor 30. A thermal reactor 40 for treating the exhaust gas is interposed between the engine 10 and an exhaust pipe 50. In a first embodiment of the invention, the carburetor 30 is deliberately adjusted to produce a considerably rich air-fuel mixture having an air/fuel ratio far from the stoichiometric value and low enough to ensure a minimized NOx concentration in the exhaust gas. The ignition sequence of the four cylinders 11-14, is 11-12-14-13. According to the invention, two cylinders 11 and 14 are supplied with the above-mentioned rich mixture, but the remaining two cylinders 12 and 13 are under the control of air feed devices 60 connected to two branches 22, 23 of the intake manifold 20 at locations close to the intake ports of the two cylinders 12, 13. The air feed devices 60 take in air from the atmosphere to dilute the mixture entering the two chambers 12, 13 up to an air/fuel ratio far from the stoichiometric ratio and high enough to bring about a satisfactory reduction of NOx content in the exhaust.

Figure 2:
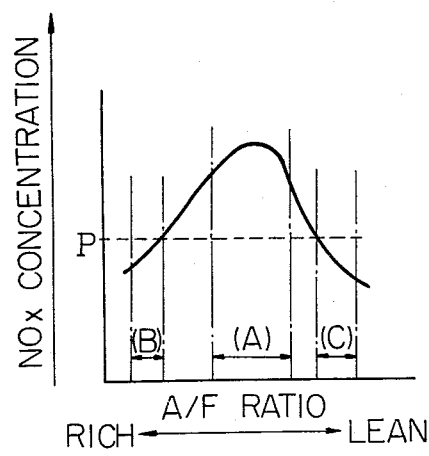
FIG. 2 is a graph showing the relationship between the air/fuel ratio of a combustion mixture and NOx concentration in the exhaust gas.

As seen from FIG. 2, the amount of NOx in the exhaust from an internal-combustion engine depends greatly on the air/fuel ratio of the combustible mixture. As mentioned before, NOx concentration is highest in the range (A), in which lie the stoichiometric ratio and values employed in most conventional engine systems. According to the invention, on the other hand, the rich mixture from the carburetor 30 which is directly fed to the cylinders 11 and 14 lies in the range (B), and the lean mixture for the cylinders 12 and 13 resulting from air augmentation by means of the air feed devices 60 corresponds to the range (C). Both the rich (B) and the lean (C) ranges are determined to reduce the NOx concentration below a desired value P.

Figure 3:
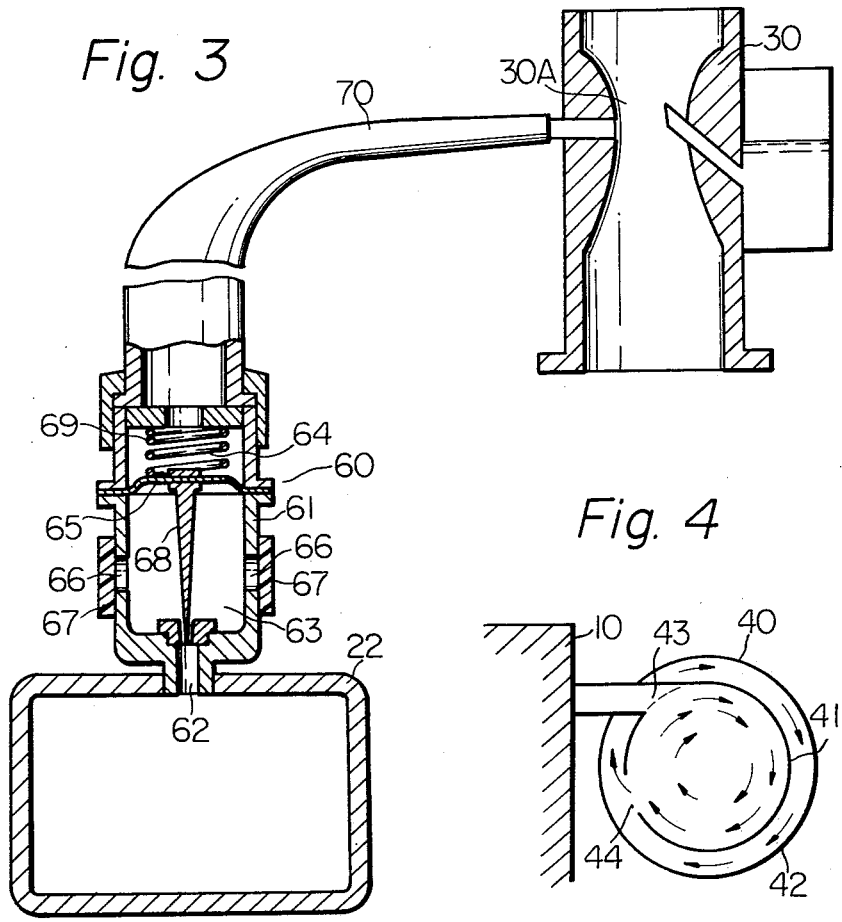
FIG. 3 is a sectional view of the air feed device of FIG. 1.

The air feed device 60 will now be described in detail with reference to FIG. 3. A housing 61 of the device 60 is connected to the intake manifold branch 22, so that an outlet 62 is exposed to the interior of the branch 22. The interior of the housing 61 is divided into two chambers 63 and 64 by a flexible diaphragm 65, and the chamber 63 having the outlet 62 is exposed also to the atmosphere through air inlets 66 equipped with air cleaners 67. A needle valve 68 is attached to the diaphragm 65 to control the communication through the outlet 62, and the diaphragm 65 is compressed towards the chamber 63 by a spring 69 installed in the chamber 64. The chamber 64 communicates with the carburetor 30 at a venturi section 30A through a pipe 70.

When the engine 10 is in operation, a negative pressure or vacuum is developed at the venturi section 30A, which is approximately proportional to the engine speed and throttle opening. The negative pressure causes the flexible diaphragm 65 to flex against the force of the spring 69, resulting in an upward movement of the needle valve 68 to open the outlet 62. The pressure in the chamber 63 is then reduced to a negative pressure equal to that in the intake manifold 20, so that air begins to flow into the chamber 63 through the air cleaner 67 and the inlets 66 and naturally enters the manifold branch 22. A suitable air feed rate, or an air/fuel ratio for the cylinders 12, 13 by the device 60 can be selected by determination of such factors as the configuration of the needle valve 68 and the outlet 62, the force of the spring 69, and so on. It will be understood that air-feed for producing the lean mixture may alternatively be accomplished by provision of only one air feed device 60 communicating with both branches 22 and 23.

Figure 4:
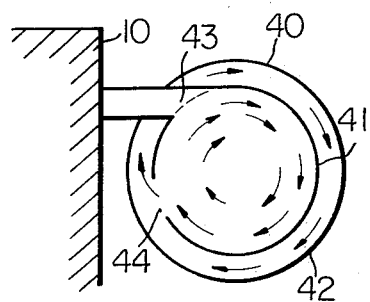
FIGS. 4 and 5 are diagrammatical sections of a thermal reactor for the engine of FIG. 1; showing a cross-section and longitudinal section, respectively.
Figure 5:
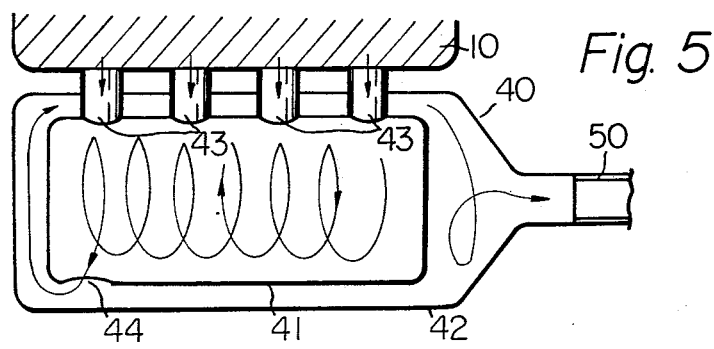

The exhaust gases from the four cylinders 11-14 are fed into the thermal reactor 40 which is located close to the exhaust ports of the engine 10. As shown in FIGS. 4 and 5, the thermal reactor 40 comprises double cylinders, namely, an inner cylinder 41 and an outer cylinder 42. Four exhaust inlets 43 corresponding to the four engine cylinders 11–14 are formed through the peripheral wall of the inner cylinder 41 in such an arrangement that the exhaust gases enter the inner cylinder 41 in the tangential direction and swirl around within the inner cylinder 41. An outlet 44 formed at an end of the inner cylinder 41 allows the exhaust to jet into the outer cylinder 42 and to again swirl and/or circulate in the outer cylinder 42.

It will be understood that the engine 10 discharges two types of exhausts, that is, a first exhaust (R) from the cylinders 11, 14 and a second exhaust (L) from the cylinders 12, 13. In addition to the extremely reduced NOx concentration in both types of exhausts (R) and (L), other two kinds of serious pollutants, namely, unburned hydrocarbons (HC) and carbon monoxide (CO) are also extremely reduced in the exhaust (L) due to a large amount of available air. However, the concentrations of HC and CO in the exhaust (R) are considerably higher than those in ordinary exhausts resulting from air/fuel ratios near the stoichiometric because of an excessively reduced air content. As seen from the above description of the thermal reactor 40, these two types of exhausts (R) and (L) are thoroughly mixed with each other during the swirling flow in the reactor 40. It is an important basis for the present invention that HC and CO contained in large amounts in the exhaust (R) can be almost completely oxidized within the reactor 40 due to existence of excess oxygen in the exhaust (L) and considerably high exhaust temperatures. The oxidation reaction $$(HC + CO) + O_2 \rightarrow H_2O + CO_2$$

proceeds easily because the gases are swirling continuously, and cooling of the exhausts is prevented due to the direct introduction thereof into the inner cylinder 41.

Consequently, all of the three major pollutants from the engine 10, namely, NOx HC and CO, do not exceed permissible concentrations in the mixed exhaust flowing into the exhaust pipe 50.

Figure 6:
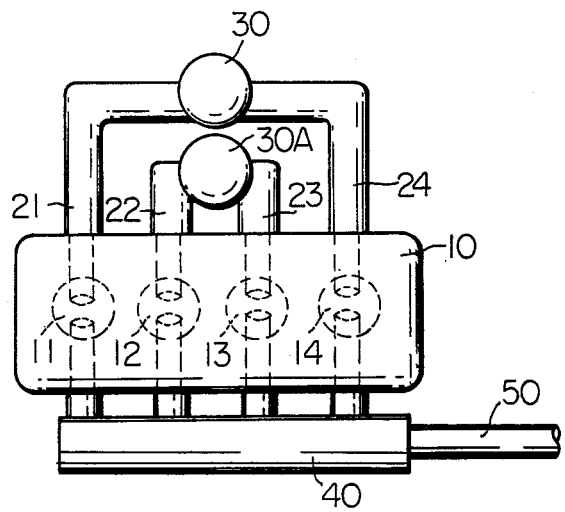
FIG. 6 is a similar view to FIG. 1, showing employment of an additional carburetor in place of the air feed devices.

As a modification of the above described embodiment of the invention, provision of one more carburetor 30A shown in FIG. 6 instead of the air feed devices 60 may be employed to produce the lean mixture for the half 12, 13 of the four cylinders. When the devices 60 are combined with a hydrogen peroxide supply system in place of the above described atmosphere, are obtained further advantages such as facilitating the engine starting, enabling the use of ordinary wedge combustion chambers despite an extremely high air/fuel ratio, and acceleration of the oxidation reaction in the reactor 40.

Figure 7:
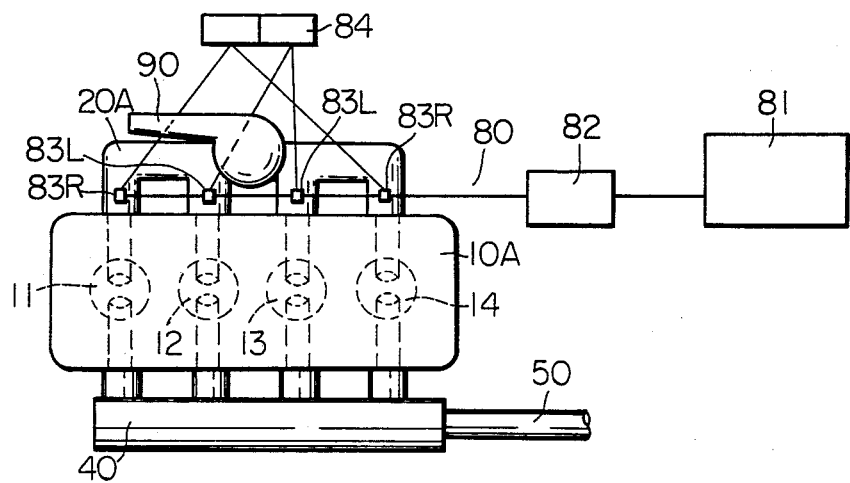
FIG. 7 is a block diagram of a four-cylinder engine equipped with a fuel injection system, showing a second embodiment of the invention.

A second embodiment of the invention will now be presented referring to FIG. 7, which shows a four-cylinder engine 10A equipped with a fuel injection system 80. Four cylinders 11–14 are combined with an intake manifold 20A into which air is drawn through an air cleaner 90. The fuel injection system 80 includes a fuel tank 81, a fuel pump 82, two pairs of injectors 83R and 83L engaged with four branches of the manifold 20A, and a computer 84. An exhaust system is made up of a thermal reactor 40 and an exhaust pipe 50, both similar to those of FIG. 1. The ignition order in this engine 10A is also determined to be in sequence of 11-12-14-13. The computer 84 is programmed in such a way that the pair of the injectors 83R arranged for the two cylinders 11, 14 inject a larger amount of fuel than the other pair of injectors 83L arranged for the remaining cylinders 12, 13. The amounts of fuel injection are regulated to give the afore-mentioned two types of mixtures corresponding to the ranges (B) and (C) in FIG. 2 for the cylinders 11 and 14 and the other two cylinders 12, 13, respectively.

As a result, the engine 10A discharges two types of exhausts similar to the exhausts (R) and (L) from the engine 10 of FIG. 1. The mixing of the exhausts and oxidation of HC and CO are accomplished in the reactor 40 in accordance with the previous description.

Although the above description relates to four-cylinder engines, it will be apparent that the invention is applicable to all multi-cylinder engines. Furthermore, it is to be understood that the apportionment of cylinders according to the invention to the rich and lean mixtures is not necessarily limited to the strict division in two. It is possible to employ, for example, a two-to-four apportionment in a six-cylinder engine so far as a smooth engine operation and a proper ratio of $O_2$:(HC + CO) in the total exhaust can be attained. The invention is applicable also to multi-chamber rotating-piston engines.

To summarize, the object of reducing the NOx concentration in the exhaust from multi-cylinder engines, while allowing the engine to operate smoothly, is accomplished by supplying approximately half the number of cylinders with a mixture having an air/fuel ratio considerably lower than the stoichiometric ratio and the remaining cylinders with another air/fuel ratio considerably high than the stoichiometric. Despite temporary increase in the HC and CO concentrations due to employment of the rich mixture, both HC and CO can be almost completely eliminated by the use of a thermal reactor due to existence of excess oxygen left after combustion of the lean mixture. It is to be specially mentioned that these surprising advantages of the invention can be obtained by extremely simple and inexpensive modifications such as the adjustment of a conventional carburetor, provision of an air feed device which is essentially a simple valve unit, or regulation of fuel injectors, and that the invention is applicable to practically all types of conventional multicylinder or multi combustion chamber internal-combustion engines requiring only some minor modifications thereof.

What is claimed is:

1. A method of reducing concentration of oxides of nitrogen (NOx) in exhaust gas from a multi-cylinder internal-combustion engine comprising; supplying a first air-fuel mixture having a first air/fuel ratio lower than a stoichiometric ratio to a first group of engine cylinders consisting of of about half the number of total engine cylinders, supplying a second air-fuel mixture having a second air-fuel ratio higher than said stoichiometric ratio to a second group of engine cylinders consisting of the remaining engine cylinders, and mixing the exhaust gases from said first and second groups of engine cylinders with each other, each without any pretreatment, before emission into the atmosphere, wherein said first air-fuel mixture is prepared in a carburetor and said second air-fuel mixture is prepared by introducing air into said first air-fuel mixture while said first air-fuel mixture is flowing through intake manifold branches connected with said second group of engine cylinders.

2. A method as claimed in claim 1, wherein said second air-fuel mixture is prepared by exposing said manifold branches to the atmosphere through a valve governed by vacuum at a venturi section of said carburetor.

3. The method as claimed in claim 1, wherein said exhaust gases from said first and second groups of engine cylinders are mixed in a thermal reactor.

4. The method as claimed in claim 3, wherein said exhaust gases are introduced into said thermal reactor in a tangential direction.

5. A method of operating a multi-cylinder internal combustion engine having first and second groups of cylinders, comprising the steps of:
 feeding a first air-fuel mixture richer than the stoichiometric mixture into all the cylinders of the engine during their intake strokes; and
 further feeding supplemental air into the second group of cylinders of the engine so that the second group of cylinders receive a second air-fuel mixture leaner than the stoichiometric mixture.

6. A method as claimed in claim 5, further comprising the step of controlling the flow of supplemental air in response to at least one engine operating condition.

7. A multi-cylinder internal combustion engine having first and second groups of cylinders, comprising:
 a carburetor supplying a first air-fuel mixture richer than stoichiometric air-fuel mixture into all the cylinders of the engine;
 an intake manifold connecting said carburetor to all the cylinders of the engine;
 supplemental air feed means feeding air into the second group of cylinders of the engine such that the second group of the cylinders receive a second air-fuel mixture leaner than the stoichiometric air-fuel mixture.

8. A multi-cylinder internal as claimed in claim 7 further comprising control means controlling flow of said supplemental air in response to at least one engine operating condition.

* * * * *